United States Patent
Achilles et al.

(10) Patent No.: US 11,901,735 B2
(45) Date of Patent: Feb. 13, 2024

(54) SYSTEM AND METHOD FOR REDUCING INSTABILITY IN REACTIVE POWER COMMAND OF AN INVERTER-BASED RESOURCE

(71) Applicant: General Electric Renovables Espana, S.L., Barcelona (ES)

(72) Inventors: Alfredo Sebastian Achilles, Niskayuna, NY (US); Sudipta Dutta, Lagrangeville, NY (US); Randal Voges, Clifton Park, NY (US); Enno Ubben, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 163 days.

(21) Appl. No.: 17/512,004

(22) Filed: Oct. 27, 2021

(65) Prior Publication Data
US 2023/0128865 A1   Apr. 27, 2023

(51) Int. Cl.
 H02J 3/24 (2006.01)
(52) U.S. Cl.
 CPC ............ *H02J 3/24* (2013.01); *H02J 2300/28* (2020.01)
(58) Field of Classification Search
 None
 See application file for complete search history.

(56) References Cited

U.S. PATENT DOCUMENTS

| | | | |
|---|---|---|---|
| 2013/0175871 A1 | 7/2013 | Knüppel et al. | |
| 2016/0268940 A1* | 9/2016 | Achilles | H02P 9/00 |
| 2019/0214821 A1* | 7/2019 | Burra | F03D 7/048 |
| 2020/0083710 A1* | 3/2020 | Ganireddy | H02J 3/381 |

FOREIGN PATENT DOCUMENTS

| | | |
|---|---|---|
| EP | 3068007 A1 | 9/2016 |
| EP | 3075052 B1 | 1/2018 |
| EP | 3322061 A1 | 5/2018 |

OTHER PUBLICATIONS

The EP Search Report for EP application No. 22198 492.5, dated Apr. 6, 2023, 8 pages.

* cited by examiner

*Primary Examiner* — Jared Fureman
*Assistant Examiner* — Aqeel H Bukhari
(74) *Attorney, Agent, or Firm* — Dority & Manning, P.A.

(57) ABSTRACT

A method for controlling a power system having at least one inverter-based resource connected to an electrical grid includes monitoring, via at least one controller of the at least one inverter-based resource, one or more command signals issued by a system-level controller. The method also includes determining, via the at least one controller of the at least one inverter-based resource, whether the one or more command signals issued by the system-level controller includes oscillatory behavior characteristic of an instability. In response to determining that the one or more command signals issued by the system-level controller includes oscillatory behavior characteristic of the instability, the method includes reducing one or more gains of a volt-var regulator of the system-level controller to reduce the instability.

17 Claims, 8 Drawing Sheets

SYSTEM AND METHOD FOR REDUCING INSTABILITY IN REACTIVE POWER COMMAND OF AN INVERTER-BASED RESOURCE

FIELD

The present disclosure relates generally inverter-based resources and, more particularly, to systems and methods for reducing instability in the reactive power command of an inverter-based resource to improve plant-level volt/VAR control.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity that is transferred to a power grid. The power grid transmits electrical energy from generating facilities to end users.

Wind power generation is typically provided by a wind farm, which contains a plurality of wind turbine generators (e.g., often 100 or more wind turbines). Typical wind farms have a farm-level controller that regulates the voltage, reactive power, and/or power factor at the wind farm interconnection point (i.e., the point at which the local wind turbine generators are connected to the grid; may also be referred to as the point of common coupling). In such wind farms, the farm-level controller achieves its control objectives by sending reactive power or reactive current commands to the individual wind turbine generators within the wind farm. However, certain constraints of the local wind turbine generators within the wind farm can constrain the capability to supply reactive power. Such constraints, may include, for example, voltage limits, reactive power limits, and/or current limits.

More specifically, when one or more of the wind turbine generators reaches one of the above constraints, the local turbine-level controllers may not be able to follow the requested reactive power command from the farm-level controller.

In addition, farm-level controllers are often required to have high gains to meet fast voltage regulation requirements. Under normal grid conditions, the high gains may be adequate. However, if the grid strength is reduced significantly as a result of a contingency, then the high gains might adversely affect stable operation.

Accordingly, the present disclosure is directed to a system and method for reducing instability in the reactive power command of an inverter-based resource to improve farm-level volt/VAR control by equipping the farm-level controller with the capability to reduce the gains, such that the wind farm can be stabilized.

BRIEF DESCRIPTION

Aspects and advantages of the invention will be set forth in part in the following description, or may be obvious from the description, or may be learned through practice of the invention.

In one aspect, the present disclosure is directed to a method for controlling a power system having at least one inverter-based resource connected to an electrical grid. The method includes monitoring, via at least one controller of the at least one inverter-based resource, one or more command signals issued by a system-level controller. The method also includes determining, via the at least one controller of the at least one inverter-based resource, whether the one or more command signals issued by the system-level controller includes oscillatory behavior characteristic of an instability. In response to determining that the one or more command signals issued by the system-level controller includes oscillatory behavior characteristic of the instability, the method includes reducing one or more gains of a volt-var regulator of the system-level controller to reduce the instability.

In an embodiment, the command signal(s) may include a reactive power command signal.

In another embodiment, the method may include at least one of filtering or analyzing the one or more command signals issued by the system-level controller. More specifically, in an embodiment, the method may include filtering and analyzing the command signal(s) issued by the system-level controller. In such embodiments, filtering the command signal(s) issued by the system-level controller may include filtering the command signal(s) issued by the system-level controller via a plurality of wash-out filters and a lag filter. In addition, in an embodiment, analyzing the command signal(s) issued by the system-level controller may include determining a magnitude of the filtered command signal(s), amplifying the magnitude of the filtered command signal(s), and comparing the amplified magnitude of the filtered command signal(s) to a magnitude threshold.

In further embodiments, when the amplified magnitude of the filtered command signal(s) exceeds the magnitude threshold, the method may include starting a counter for counting a number of times the amplified magnitude crosses zero within a certain time period.

In additional embodiments, determining whether the command signal(s) issued by the system-level controller includes oscillatory behavior characteristic of the instability may include comparing the number of times the amplified magnitude crosses zero within the certain time period with a stability threshold and determining the command signal(s) issued by the system-level controller includes oscillatory behavior characteristic of the instability when the number of times the amplified magnitude crosses zero within the certain time period exceeds the stability threshold.

In several embodiments, the method may include resetting the counter for counting the number of times the amplified magnitude crosses zero within the certain time period after the instability is reduced.

In further embodiments, reducing the one or more gains of the volt-var regulator of the system-level controller to reduce the instability may include incrementally implementing a gain reduction counter for determining how much to reduce the one or more gains of the volt-var regulator of the system-level controller to reduce the instability.

In yet another embodiment, the method may include resetting the one or more gains of the volt-var regulator of the system-level controller after the instability is reduced.

Moreover, in an embodiment, in response to determining that the one or more command signals issued by the system-level controller comprises the oscillatory behavior characteristic of the instability, the method may include also maintaining a power output of the at least one inverter-based resource transmitted to the electrical grid.

In particular embodiments, the system-level controller may include high gains to meet fast-voltage requirements of the electrical grid. In such embodiments, the method may include receiving an indication that a strength of the electrical grid has reduced by a certain amount before determining whether the command signal(s) issued by the system-level controller includes oscillatory behavior characteristic of the instability.

In still another embodiment, the power system may include a plurality of inverter-based resources, the at least one inverter-based resource being one of the plurality of inverter-based resources. Further, in an embodiment, the power system may be a wind farm and the at least one inverter-based resource may be a plurality of wind turbine power systems.

In another aspect, the present disclosure is directed to a system for controlling a wind farm having a plurality of wind turbine generators connected to an electrical grid. The system includes a controller configured to perform a plurality of operations, including but not limited to monitoring a reactive power command signal issued by a farm-level controller of the wind farm, determining whether the reactive power command signal includes oscillatory behavior characteristic of an instability, and in response to determining that the reactive power command signal includes oscillatory behavior characteristic of the instability, reducing one or more gains of a volt-var regulator of the farm-level controller to reduce the instability. It should be understood that the system may further include any additional features and/or embodiments described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
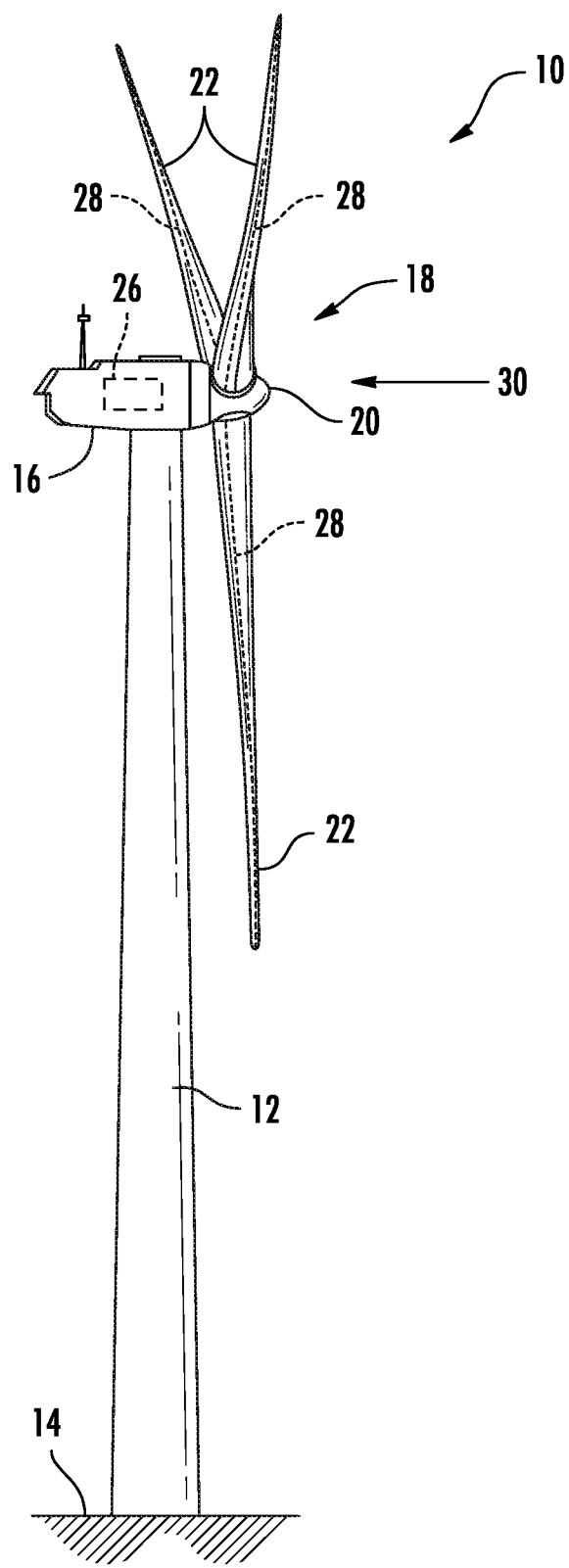
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a systems and methods for monitoring the reactive power command issued by a farm-level controller of a wind turbine to a plurality of wind turbines thereof to check for instability based on oscillatory behavior. If there are oscillations in the reactive power command which are characteristic of instability due to large proportional and integral gains in the volt-var control path of the farm-level controller, then these gains are reduced which mitigates the unstable behavior. Once the gains are reduced, the gains can be increased manually by active operator commands. Thus, the present disclosure provides a computer-implemented algorithm configured to analyze the reactive power command to detect whether the command is unstable or not. If unstable, the present disclosure can also determine whether the cause is high gains of the farm-level controller. Thus, in an embodiment, the present disclosure is particularly suitable for wind farms with high gains to obtain a fast speed of response, however, due to sudden change in system conditions such a contingency, these high gains cause instability.

Although the present technology described herein is explained with reference to a wind farm having a plurality of wind turbine generators, it should be understood that the present technology may also be implemented for any suitable application having the ability to rapidly control reactive power. As used herein, inverter-based resources generally refer to electrical devices that can generate or absorb electric power through switching of power-electronic devices. Accordingly, inverter-based resource may include wind turbine generators, solar inverters, energy-storage systems, STATCOMs, or hydro-power systems.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 1) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
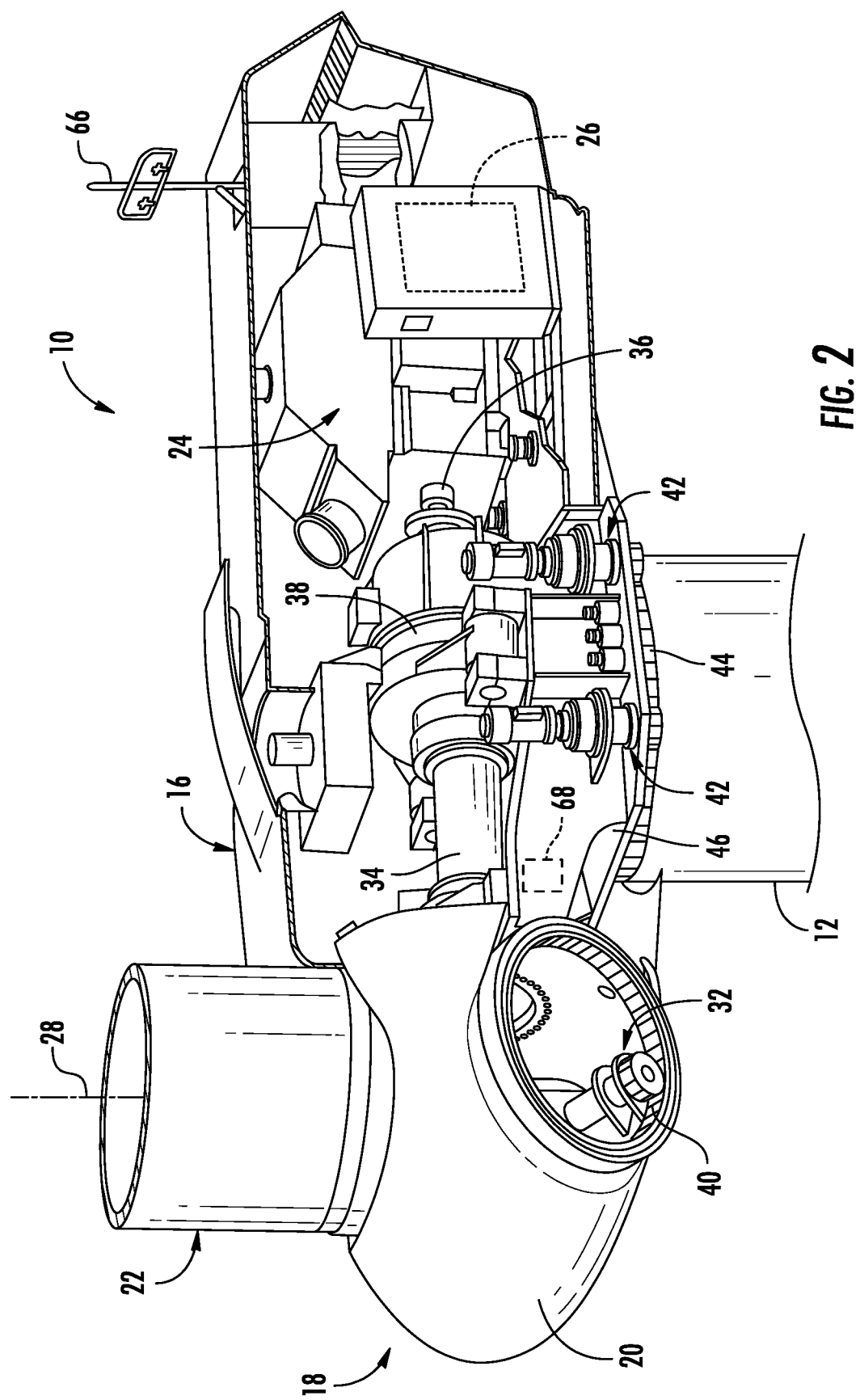
FIG. 2 illustrates a simplified, internal view of one embodiment of a nacelle according to the present disclosure.
Figure 4:
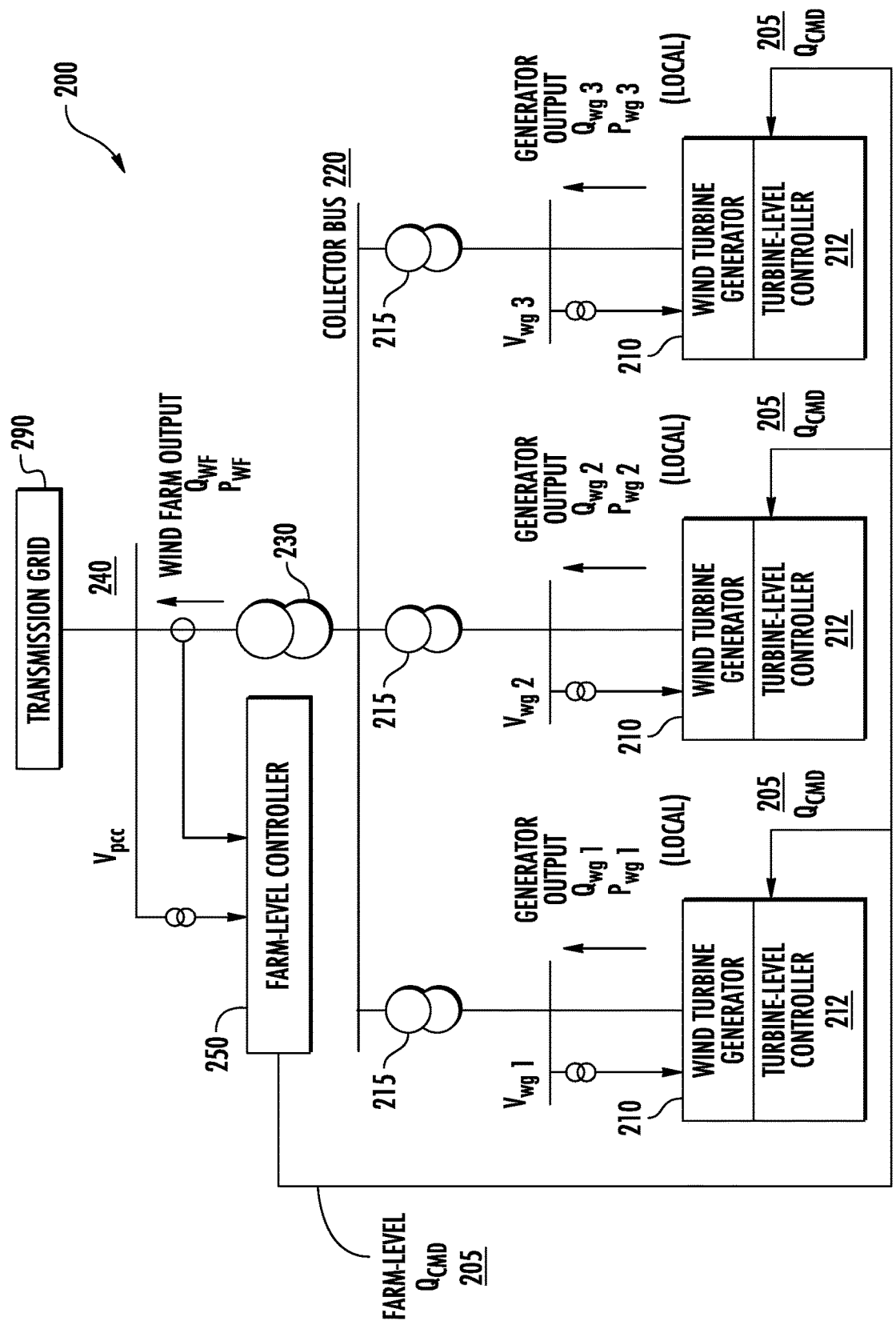
FIG. 4 illustrates a block diagram of a wind farm having multiple wind turbine generators coupled with a transmission grid according to the present disclosure.

Referring now to FIG. 2, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 3:
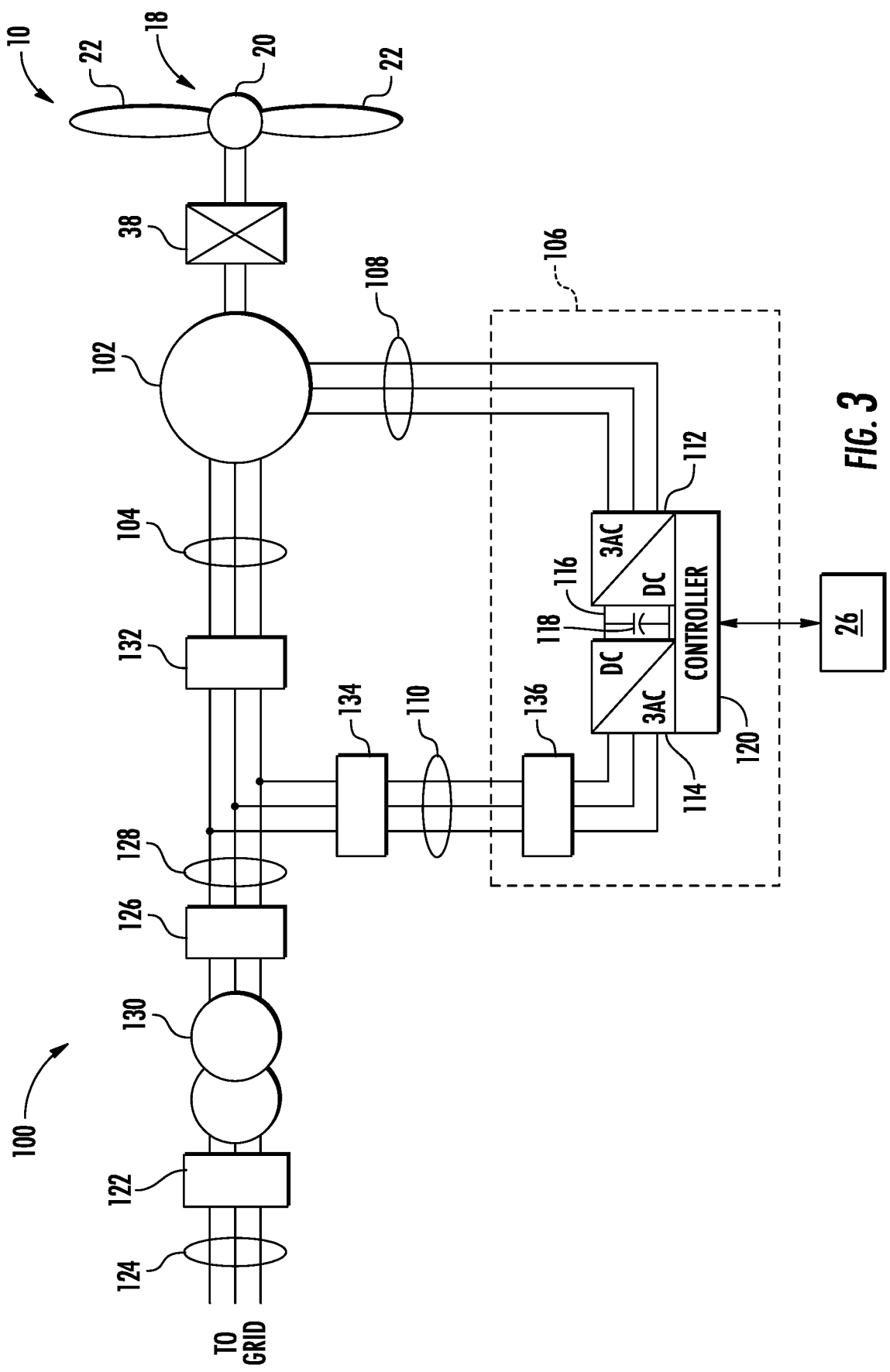
FIG. 3 illustrates a schematic view of one embodiment of a wind turbine electrical power system suitable for use with the wind turbine shown in FIG. 1.

Referring now to FIG. 3, a schematic diagram of one embodiment of a wind turbine power system 100 is illustrated in accordance with aspects of the present disclosure. Although the present disclosure will generally be described herein with reference to the wind turbine 10 shown in FIG. 1, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 3 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor-side converter (RSC) 112 and a line-side converter (LSC) 114. The DFIG 102 is coupled via the rotor bus 108 to the rotor-side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor-side converter 112 and/or the line-side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus 108, sinusoidal multi-phase (e.g., three-phase) alternating current (AC) power is provided to the power converter 106. The rotor-side converter 112 converts the AC power provided from the rotor bus 108 into direct current (DC) power and provides the DC power to the DC link 116. As is generally understood, switching elements (e.g., IGBTs) used in the bridge circuits of the rotor-side converter 112 may be modulated to convert the AC power provided from the rotor bus 108 into DC power suitable for the DC link 116.

In addition, the line-side converter 114 converts the DC power on the DC link 116 into AC output power suitable for the electrical grid 124. In particular, switching elements (e.g., IGBTs) used in bridge circuits of the line-side converter 114 can be modulated to convert the DC power on the DC link 116 into AC power on the line side bus 110. The AC power from the power converter 106 can be constrained with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Referring now to the drawings, FIG. 4 illustrates a block diagram of a wind farm 200 having a plurality of wind turbine generators 210 coupled with a transmission grid 190. FIG. 4 illustrates three wind generators 210; however, any number of wind generators can be included in a wind farm 200. Further, as shown, each of the wind turbine generators 210 includes a local controller 212 that is responsive to the conditions of the wind turbine generator 210 being controlled. In one embodiment, the controller for each wind turbine generator senses only the terminal voltage and current (via potential and current transformers). The sensed voltage and current are used by the local controller to provide an appropriate response to cause the wind turbine generator 210 to provide the desired reactive power.

Each wind turbine generator 210 is coupled to collector bus 220 through generator connection transformers 215 to provide real and reactive power (labeled $P_{wg}$ and $Q_{wg}$, respectively) to the collector bus 220. Generator connection transformers and collector buses are known in the art.

The wind farm 200 provides real and reactive power output (labeled $P_{wf}$ and $Q_{wf}$, respectively) via wind farm main transformer 230. The farm-level controller 250, which is communicatively coupled to the turbine-level controllers 212, senses the wind farm output, as well as the voltage at the point of common coupling (PCC) 240, to provide a Q command signal 205 ($Q_{CMD}$) that indicates desired reactive power at the generator terminals to ensure a reasonable distribution of reactive power among the wind turbines. In alternate embodiments, the Q command signal ($Q_{CMD}$) 205 may be generated as the local or operator level (indicated by the "LOCAL" lines in FIG. 4), for example in the event that the wind turbine generator(s) is in manual mode or otherwise not in communication with the wind farm-level controller 250.

Figure 5:
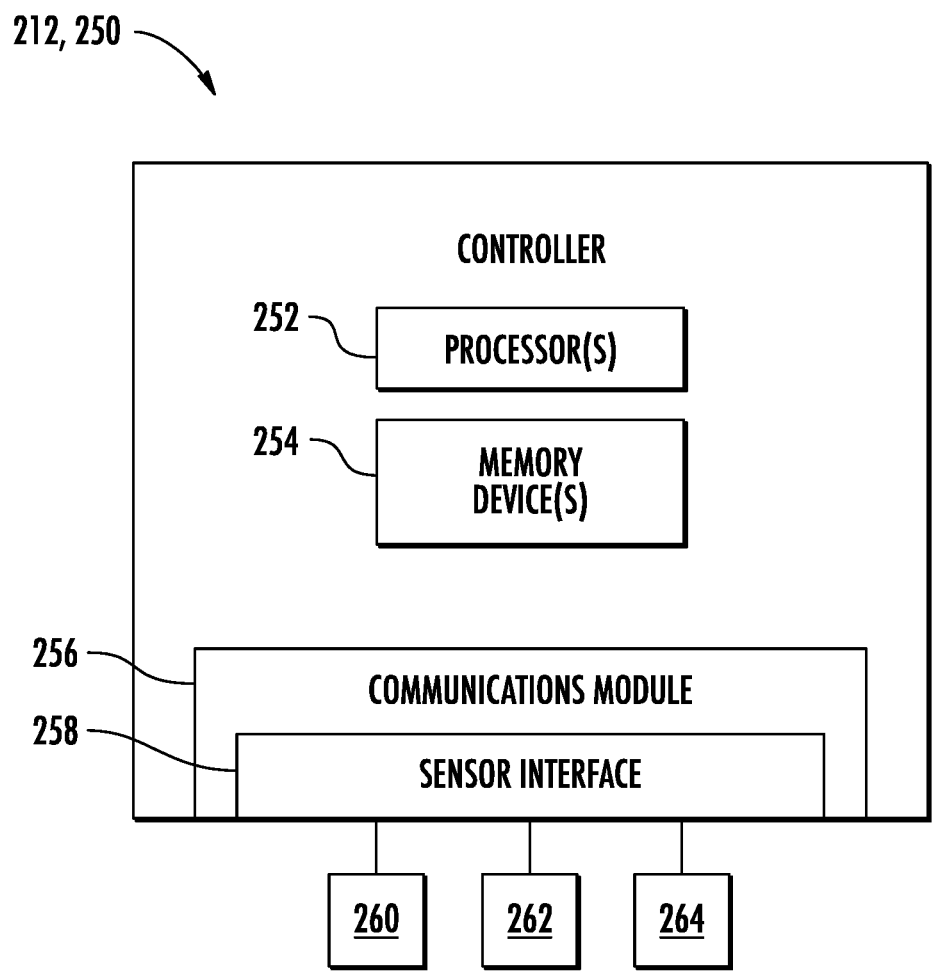
FIG. 5 illustrates a block diagram of suitable components that may be included in one embodiment of a farm-level controller according to the present disclosure.

Referring now to FIG. 5, a block diagram of one embodiment of suitable components that may be included within the turbine-level controllers 212 and/or the farm-level controller 250 in accordance with aspects of the present disclosure is illustrated. As shown, the controller 212, 250 may include one or more processor(s) 252 and associated memory device(s) 254 configured to perform a variety of computer-implemented functions (e.g., performing the methods, steps, calculations and the like and storing relevant data as disclosed herein). Additionally, the controller 212, 250 may also include a communications module 256 to facilitate communications between the controller 212, 250 and the various components of the wind farm 200. Further, the communications module 256 may include a sensor interface 258 (e.g., one or more analog-to-digital converters) to permit signals transmitted from one or more sensors 260, 262, 264 to be converted into signals that can be understood and processed by the processors 252. It should be appreciated that the sensors 260, 262, 264 may be communicatively coupled to the communications module 256 using any suitable means. For example, as shown, the sensors 260, 262, 264 are coupled to the sensor interface 258 via a wired connection. However, in other embodiments, the sensors 260, 262, 264 may be coupled to the sensor interface 258 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 254 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 254 may generally be configured to store suitable computer-readable instructions that, when implemented by the processor(s) 252, configure the controller 212, 250 to perform various functions as described herein.

The sensors 260, 262, 264 may include any suitable sensors configured to provide feedback measurements to the farm-level controller 250. In various embodiments, for example, the sensors 260, 262, 264 may be any one of or combination of the following: voltage sensors, current sensors, and/or any other suitable sensors.

Figure 6:
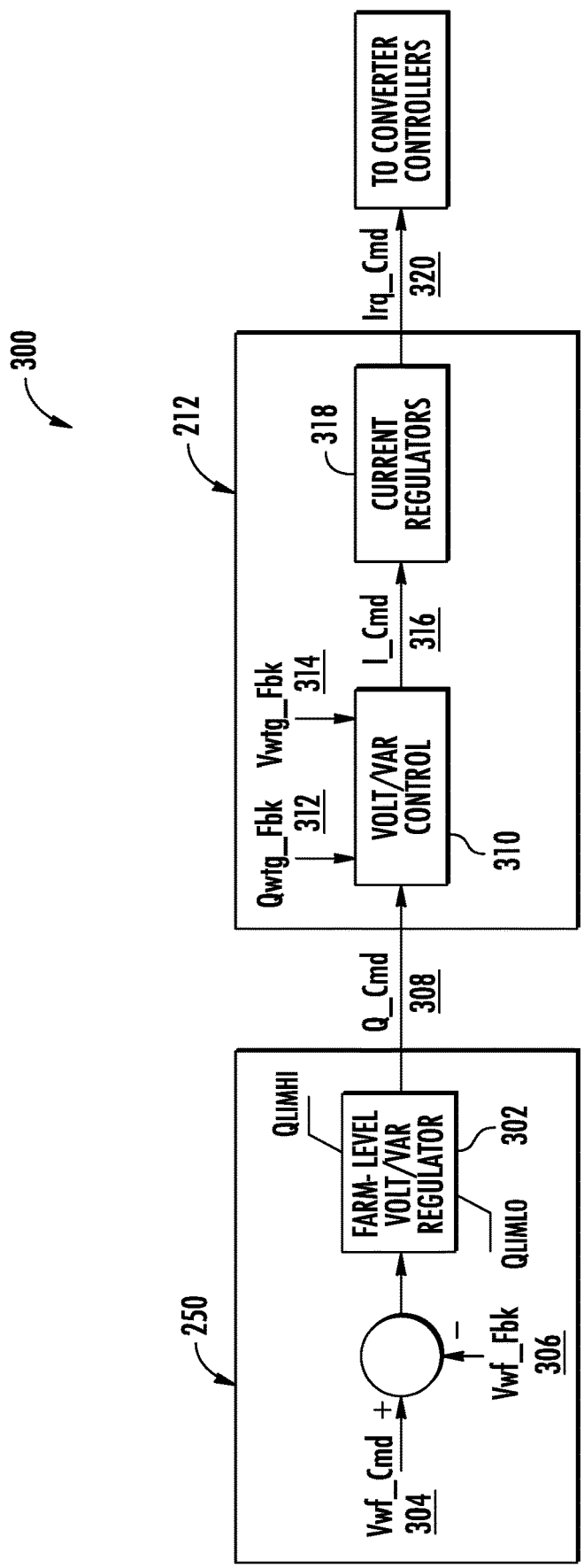
FIG. 6 illustrates a functional diagram of one embodiment of farm-level and turbine-level regulators according to the present disclosure.
Figure 7:
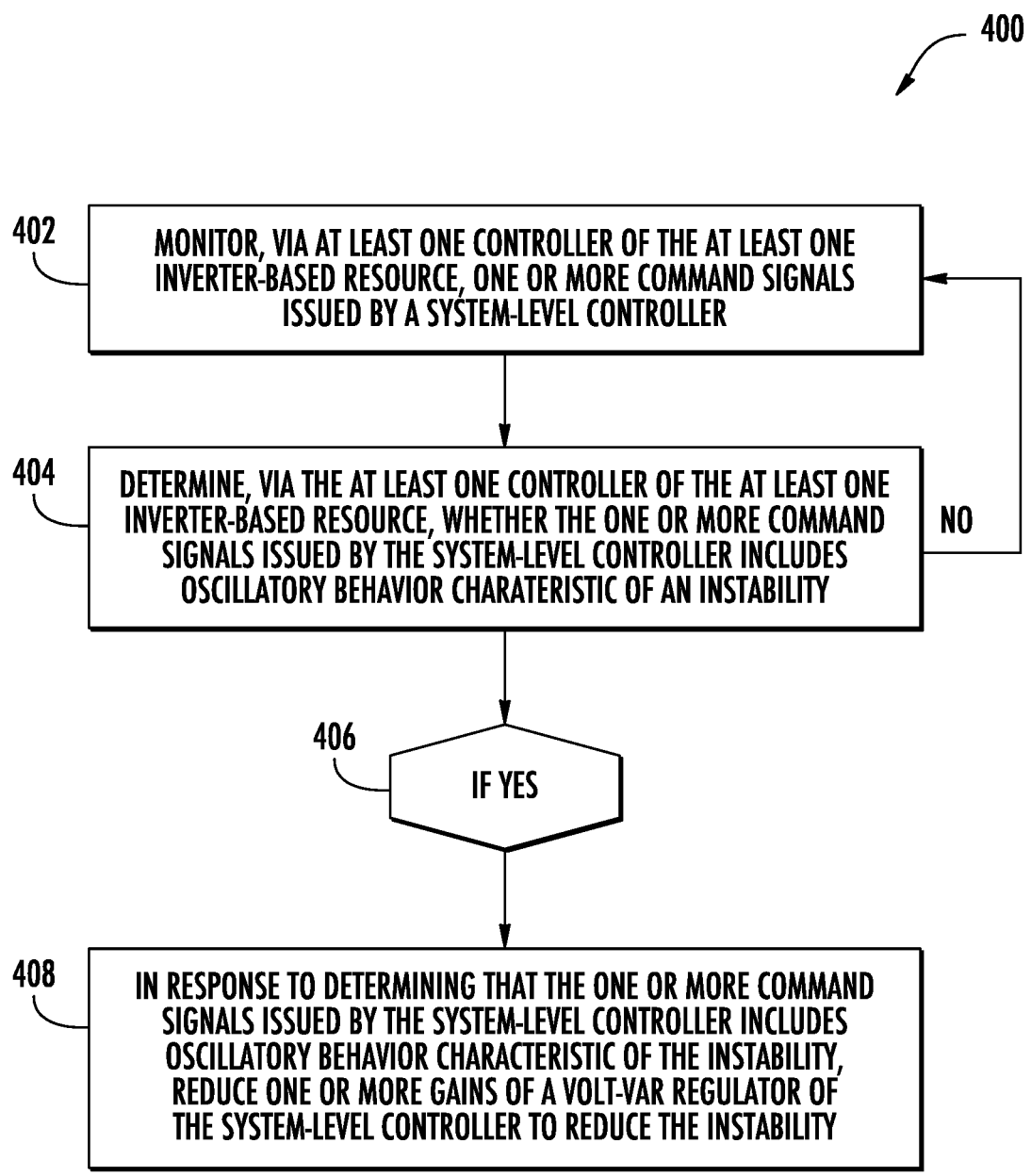
FIG. 7 illustrates a flow diagram of one embodiment of a method for controlling a power system having at least one inverter-based resource connected to an electrical grid according to the present disclosure.
Figure 8:
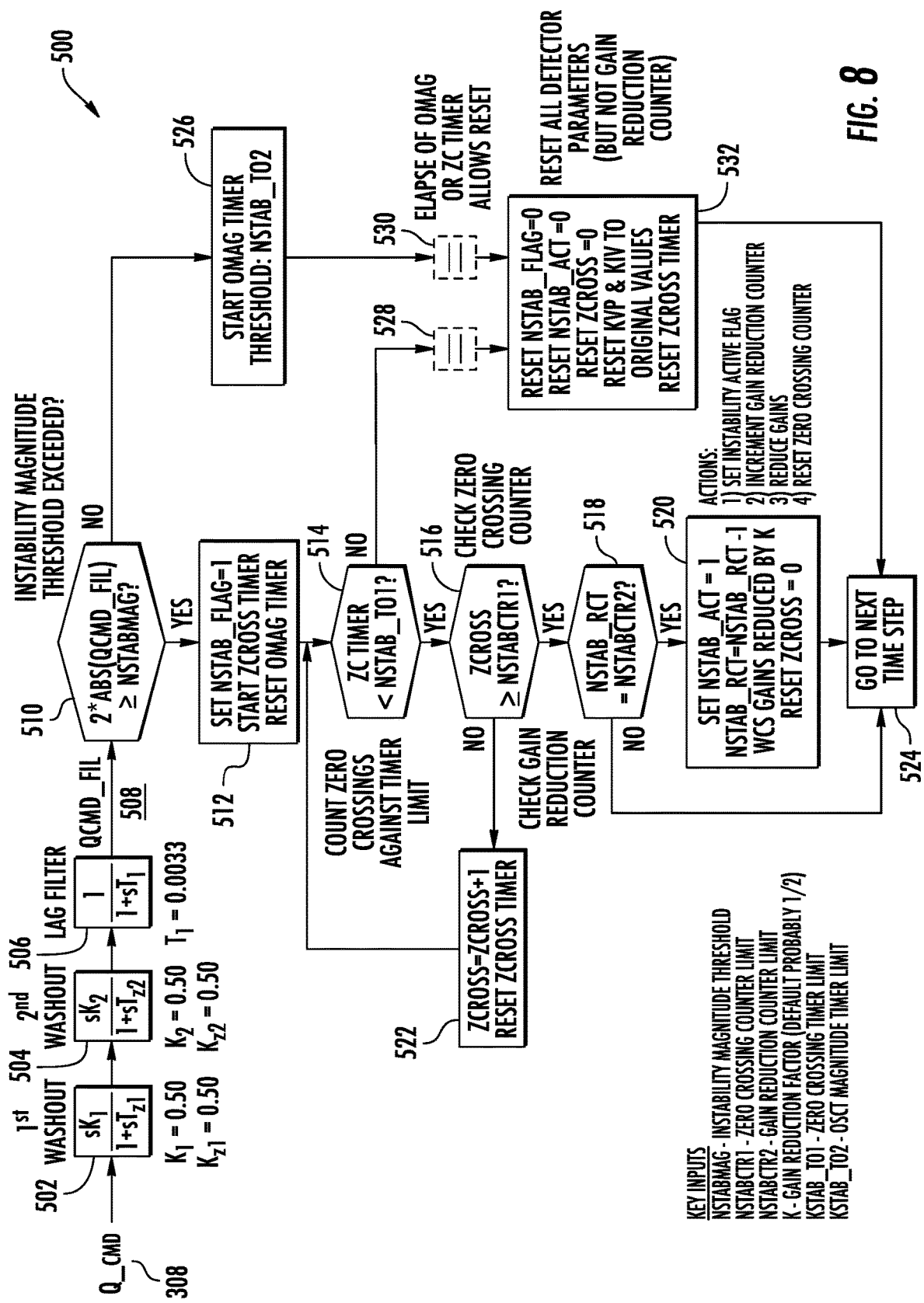
FIG. 8 illustrates a flow diagram of an embodiment of control logic implemented by a controller according to the present disclosure.

Referring now to FIGS. 6-8, embodiments of various systems and methods for controlling a power system, such as a wind farm, according to the present disclosure are illustrated. In particular, FIG. 6 illustrates a functional diagram of one embodiment of the farm-level controller 250 and the turbine-level controllers 212. FIG. 7 illustrates a flow diagram of one embodiment of a method 400 for controlling a power system, such as a wind farm, according to the present disclosure. FIG. 8 illustrates another flow diagram of an embodiment of control logic implemented by a controller according to the present disclosure.

Referring particularly to FIG. 6, a practical implementation of the system 300 for controlling the wind farm 200 is illustrated. In particular, as shown, the farm-level controller 250 may include a volt-var regulator 302 with upper and lower limits (e.g., $Q_{LIMHI}$ and $Q_{LIMLO}$). More specifically, as shown, the farm-level controller 250 is configured to receive one or more voltage commands of the wind farm (e.g., Vwf_Cmd 304) and one or more voltage feedbacks of the wind farm 200 (e.g., Vwf_Fbk 306) that may be used by the volt-var regulator 302 for determining a reactive power command signal (e.g., Q_Cmd 308) for the turbine-level controllers 212. Moreover, as shown, each of the turbine-level controllers 212 receives the reactive power command signal 308 (i.e., via their respective turbine-level volt-var regulators 310). Thus, the turbine-level volt-var regulators 310 also receive various other parameters, such as reactive power feedbacks (e.g., Qwtg_Fbk 312) and voltage feedbacks (e.g., Vwtg_Fbk 314) of the individual wind turbines, to determine current commands (e.g., I_Cmd 316) for their respective current regulators 318. Thus, the current regulators 318 of the individual wind turbines are configured for generating a rotor current command (e.g., Irq_Cmd) 320 for the converter controller.

Referring now to FIG. 7, the method 400 described herein generally applies to operating the wind farm 200 described herein with respect to FIGS. 4 and 6. However, it should be appreciated that the disclosed method 400 may be implemented using any other power system that is configured to supply reactive power for application to a load, such as a power grid, a solar power system, a hydropower system, an energy storage power system, or combinations thereof. Further, FIG. 7 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at 402, the method 400 includes monitoring, via at least one controller of the at least one inverter-based resource, one or more command signals issued by a system-level controller. For example, in an embodiment, the command signals(s) may include the reactive power command signal 308. As shown at 404, the method 400 includes determining, via the at least one controller of the at least one inverter-based resource, whether the command signal(s) issued by the system-level controller includes oscillatory behavior characteristic of an instability.

In response to determining that the command signal(s) issued by the system-level controller includes oscillatory behavior characteristic of the instability, as shown at 406 and 408, the method 400 includes reducing one or more gains of the volt-var regulator 302 of the system-level controller (e.g., the farm-level controller 250) to reduce the instability. In particular embodiments, for example, the farm-level controller 250 may include high gains to meet fast-voltage requirements of the electrical grid. In such embodiments, the method 400 may include receiving an indication that a strength of the electrical grid has reduced by a certain amount before determining whether the command signal(s) issued by the farm-level controller 250 includes oscillatory behavior characteristic of the instability.

Referring now to FIG. 8, a detailed, flow diagram of one embodiment of control logic 500 for instability detection according to the present disclosure is illustrated. In particular, as shown, the control logic implemented by the controller receives the reactive power command signal (e.g., Q_Cmd 308). Further, as shown, the control logic 500 may include one or more filters 502, 504, 506 for filtering the reactive power command signal 308. In addition, as shown 510, the control logic 500 may also be configured to analyze the filtered reactive power command signal 508. Thus, it should be understood that any suitable amount of filtering, analyzing, and/or processing may be applied to the reactive power command signal 308.

In particular embodiments, for example, the control logic 500 may include a plurality of wash-out filters 502, 504 and a lag filter 506. In addition, as shown at 510, in an embodiment, the control logic 500 may analyze the reactive power command signal 308 by determining a magnitude of the filtered reactive power command signal 508 (e.g., by determining an absolute value of the filtered reactive power command signal 508), amplifying the magnitude of the filtered reactive power command signal 508 (e.g., by multiplying the filtered reactive power command signal 508 by a factor, such as two), and comparing the amplified magnitude of the filtered reactive power command signal 508 to a magnitude threshold (e.g., NSTABMAG).

Still referring to FIG. 8, in further embodiments, as shown at 512, when the amplified magnitude of the filtered reactive power command signal 508 exceeds the magnitude threshold, the control logic 500 may include starting one or more timers, such as a zero-crossing timer (e.g., Zcross timer). In addition, as shown at 512, the control logic 500 may also reset an oscillatory magnitude time (e.g., OMAG timer). Moreover, as shown at 514, the control logic 500 may include starting a counter for counting a number of times (e.g., ZCROSS) the amplified magnitude crosses zero within a certain time period (e.g., ZC timer). Thus, as shown at 514, the control logic 500 may include determining whether the reactive power command signal 508 includes oscillatory behavior characteristic of the instability by comparing the number of times the amplified magnitude crosses zero within the certain time period with a stability threshold (e.g., NSTAB_TO1). More specifically, the control logic 500 is configured to determine the reactive power command signal 508 includes oscillatory behavior characteristic of the instability when the number of times the amplified magnitude crosses zero within the certain time period exceeds the stability threshold.

Further, as shown at 516, the control logic 500 is configured to determine whether the number of times (e.g., ZCROSS) the amplified magnitude crosses zero within the certain time period exceeds a zero crossing counter limit (e.g., NSTABCTR1). If so, as shown at 518, the control logic 500 is configured to check a gain reduction counter. Thus, as shown, if NSTAB_RCT is greater than a gain reduction counter limit (e.g., NSTABCTR2), then the control logic 500 continues at 520. If not, as shown at 522, the control logic 500 returns to step 512. In particular, as shown at 522, the control logic 500 is configured to reset the zero-crossing timer and adds a value (such as 1) to the number of times (e.g., ZCROSS) the amplified magnitude crosses zero within the certain time period.

In contrast, as shown at 520, the control logic 500 is configured to set an instability action flag (e.g., NSTAB ACT) to a certain value, such as 1. Moreover, as shown, the control logic 500 is configured to incrementally apply a gain reduction counter and reduce the gain(s) of the volt-var regulator 302 of the farm-level controller 250 to reduce the instability. More specifically, the control logic 500 may include incrementally implementing a gain reduction counter for determining how much to reduce the gain(s) (e.g., KVP and KIV) of the volt-var regulator 302 of the farm-level controller 250 to reduce the instability. For example, in an embodiment, the gain(s) may be reduced by about half. In further embodiments, the gain(s) may be reduced by any suitable amount to reduce the instability.

In addition, as shown, the control logic 500 is configured to reset the zero-crossing counter for counting the number of times the amplified magnitude crosses zero within the certain time period after the instability is reduced. Moreover, in an embodiment, the control logic 500 is configured to reset the one or more gains of the volt-var regulator 302 of the farm-level controller 250 after the instability is reduced. Thus, as shown at 524, the control logic 500 is configured to go to the next time step.

Referring still to FIG. 8, the control logic 500 also includes a control path if, as shown at 510, the instability magnitude does not exceed the magnitude threshold. For example, as shown at 526, the control logic 500 is configured to start an oscillatory magnitude timer (e.g., OMAG timer) and set an oscillatory magnitude timer limit (e.g., NSTAB_TO2). Thus, as shown at 528 and 530, the control logic 500 allows the oscillatory magnitude and the zero-crossing timer to reset. Accordingly, as shown at 532, the control logic 500 is configured to reset the instability action flag (e.g., NSTAB FLAG and NSTAB ACT) to zero, the number of times (e.g., ZCROSS) the amplified magnitude crosses zero within the certain time period to zero, and the gains (e.g., KVP and KIV) to their original values. In addition, as shown, the control logic 500 is configured to reset the zero-crossing timer as well.

In response to determining that the filtered reactive power command signal 508 includes the oscillatory behavior characteristic of the instability, the control logic 500 may also include maintaining a power output of the wind farm 200 transmitted to the electrical grid.

Further aspects of the invention are provided by the subject matter of the following clauses:

Clause 1. A method for controlling a power system having at least one inverter-based resource connected to an electrical grid, the method comprising:

monitoring, via at least one controller of the at least one inverter-based resource, one or more command signals issued by a system-level controller;

determining, via the at least one controller of the at least one inverter-based resource, whether the one or more command signals issued by the system-level controller comprises oscillatory behavior characteristic of an instability; and in response to determining that the one or more command signals issued by the system-level controller comprises oscillatory behavior characteristic of the instability, reducing one or more gains of a volt-var regulator of the system-level controller to reduce the instability.

Clause 2. The method of clause 1, wherein the one or more command signals comprises a reactive power command signal.

Clause 3. The method of clauses 1-2, further comprising at least one of filtering or analyzing the one or more command signals issued by the system-level controller.

Clause 4. The method of clause 3, further comprising filtering and analyzing the one or more command signals issued by the system-level controller, wherein filtering the one or more command signals issued by the system-level controller further comprises filtering the one or more command signals issued by the system-level controller via a plurality of wash-out filters and a lag filter.

Clause 5. The method of clause 4, wherein analyzing the one or more command signals issued by the system-level controller further comprises:

determining a magnitude of the filtered one or more command signals;

amplifying the magnitude of the filtered one or more command signals; and comparing the amplified magnitude of the filtered one or more command signals to a magnitude threshold.

Clause 6. The method of clause 5, wherein, when the amplified magnitude of the filtered one or more command signals exceeds the magnitude threshold, starting a counter for counting a number of times the amplified magnitude crosses zero within a certain time period.

Clause 7. The method of clause 6, wherein determining whether the one or more command signals issued by the system-level controller comprises oscillatory behavior characteristic of the instability further comprises:

comparing the number of times the amplified magnitude crosses zero within the certain time period with a stability threshold; and determining the one or more command signals issued by the system-level controller comprises oscillatory behavior characteristic of the instability when the number of times the amplified magnitude crosses zero within the certain time period exceeds the stability threshold.

Clause 8. The method of clause 6, further comprising resetting the counter for counting the number of times the amplified magnitude crosses zero within the certain time period after the instability is reduced.

Clause 9. The method of any of the preceding clauses, wherein reducing the one or more gains of the volt-var regulator of the system-level controller to reduce the instability further comprises:

incrementally implementing a gain reduction counter for determining how much to reduce the one or more gains of the volt-var regulator of the system-level controller to reduce the instability.

Clause 10. The method of any of the preceding clauses, further comprising resetting the one or more gains of the volt-var regulator of the system-level controller after the instability is reduced.

Clause 11. The method of any of the preceding clauses, further comprising, in response to determining that the one or more command signals issued by the system-level controller comprises the oscillatory behavior characteristic of the instability, also maintaining a power output of the at least one inverter-based resource transmitted to the electrical grid.

Clause 12. The method of any of the preceding clauses, wherein the system-level controller comprises high gains to meet fast-voltage requirements of the electrical grid, wherein the method further comprises receiving an indication that a strength of the electrical grid has reduced by a certain amount before determining whether the one or more command signals issued by the system-level controller comprises oscillatory behavior characteristic of the instability.

Clause 13. The method of any of the preceding clauses, wherein the power system comprises a plurality of inverter-based resources, the at least one inverter-based resource being one of the plurality of inverter-based resources.

Clause 14. The method of clause 10, wherein the power system comprises a wind farm and the at least one inverter-based resource comprise a plurality of wind turbine power systems.

Clause 15. A system for controlling a wind farm having a plurality of wind turbine generators connected to an electrical grid, the system comprising:
  a controller configured to perform a plurality of operations, the plurality of operations comprising:
  monitoring a reactive power command signal issued by a farm-level controller of the wind farm;
  determining whether the reactive power command signal comprises oscillatory behavior characteristic of an instability; and
  in response to determining that the reactive power command signal comprises oscillatory behavior characteristic of the instability, reducing one or more gains of a volt-var regulator of the farm-level controller to reduce the instability.

Clause 16. The system of clause 15, wherein the plurality of operations further comprise at least one of filtering or analyzing the reactive power command signal issued by the farm-level controller.

Clause 17. The system of clause 16, further comprising filtering and analyzing the reactive power command signal issued by the farm-level controller, wherein filtering the reactive power command signal issued by the farm-level controller further comprises filtering the reactive power command signal issued by the farm-level controller via a plurality of wash-out filters and a lag filter, and wherein analyzing the reactive power command signal issued by the farm-level controller further comprises:
  determining a magnitude of the filtered reactive power command signal;
  amplifying the magnitude of the filtered reactive power command signal; and
  comparing the amplified magnitude of the reactive power command signal to a magnitude threshold,
  wherein, when the amplified magnitude of the filtered reactive power command signal exceeds the magnitude threshold, starting a counter for counting a number of times the amplified magnitude crosses zero within a certain time period.

Clause 18. The system of clause 17, wherein determining whether the reactive power command signal comprises oscillatory behavior characteristic of the instability further comprises:
  comparing the number of times the amplified magnitude crosses zero within the certain time period with a stability threshold; and
  determining the one or more command signals issued by the farm-level controller comprises oscillatory behavior characteristic of the instability when the number of times the amplified magnitude crosses zero within the certain time period exceeds the stability threshold.

Clause 19. The system of clauses 15-18, wherein reducing the one or more gains of the volt-var regulator of the farm-level controller to reduce the instability further comprises:
  incrementally implementing a gain reduction counter for determining how much to reduce the one or more gains of the volt-var regulator of the farm-level controller to reduce the instability.

Clause 20. The system of clauses 15-19, further comprising, in response to determining that the reactive power command signal comprises the oscillatory behavior characteristic of the instability, also maintaining a power output of the wind farm transmitted to the electrical grid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a power system having at least one inverter-based resource connected to an electrical grid, the method comprising:
  monitoring, via at least one controller of the at least one inverter-based resource, one or more command signals issued by a system-level controller;
  filtering and analyzing the one or more command signals issued by the system-level controller, wherein filtering the one or more command signals issued by the system-level controller further comprises filtering the one or more command signals issued by the system-level controller via one or more wash-out filters and a lag filter;
  determining, via the at least one controller of the at least one inverter-based resource, whether the one or more command signals issued by the system-level controller comprises oscillatory behavior characteristic of an instability; and
  in response to determining that the one or more command signals issued by the system-level controller comprises oscillatory behavior characteristic of the instability, reducing one or more gains of a volt-var regulator of the system-level controller to reduce the instability.

2. The method of claim 1, wherein the one or more command signals comprises a reactive power command signal.

3. The method of claim 1, wherein analyzing the one or more command signals issued by the system-level controller further comprises:

determining a magnitude of the filtered one or more command signals;
amplifying the magnitude of the filtered one or more command signals; and
comparing the amplified magnitude of the filtered one or more command signals to a magnitude threshold.

4. The method of claim 3, wherein, when the amplified magnitude of the filtered one or more command signals exceeds the magnitude threshold, starting a counter for counting a number of times the amplified magnitude crosses zero within a certain time period.

5. The method of claim 4, wherein determining whether the one or more command signals issued by the system-level controller comprises oscillatory behavior characteristic of the instability further comprises:
comparing the number of times the amplified magnitude crosses zero within the certain time period with a stability threshold; and
determining the one or more command signals issued by the system-level controller comprises oscillatory behavior characteristic of the instability when the number of times the amplified magnitude crosses zero within the certain time period exceeds the stability threshold.

6. The method of claim 4, further comprising resetting the counter for counting the number of times the amplified magnitude crosses zero within the certain time period after the instability is reduced.

7. The method of claim 1, wherein reducing the one or more gains of the volt-var regulator of the system-level controller to reduce the instability further comprises:
incrementally implementing a gain reduction counter for determining how much to reduce the one or more gains of the volt-var regulator of the system-level controller to reduce the instability.

8. The method of claim 1, further comprising resetting the one or more gains of the volt-var regulator of the system-level controller after the instability is reduced.

9. The method of claim 8, wherein the power system comprises a wind farm and the at least one inverter-based resource comprise a plurality of wind turbine power systems.

10. The method of claim 1, further comprising, in response to determining that the one or more command signals issued by the system-level controller comprises the oscillatory behavior characteristic of the instability, also maintaining a power output of the at least one inverter-based resource transmitted to the electrical grid.

11. The method of claim 1, wherein the system-level controller comprises high gains to meet fast-voltage requirements of the electrical grid, wherein the method further comprises receiving an indication that a strength of the electrical grid has reduced by a certain amount before determining whether the one or more command signals issued by the system-level controller comprises oscillatory behavior characteristic of the instability.

12. The method of claim 1, wherein the power system comprises a plurality of inverter-based resources, the at least one inverter-based resource being one of the plurality of inverter-based resources.

13. A system for controlling a wind farm having a plurality of wind turbine generators connected to an electrical grid, the system comprising:
a controller configured to perform a plurality of operations, the plurality of operations comprising:
monitoring a reactive power command signal issued by a farm-level controller of the wind farm;
determining whether the reactive power command signal comprises oscillatory behavior characteristic of an instability by comparing a number of times the amplified magnitude crosses zero within the certain time period with a stability threshold and determining the one or more command signals issued by the farm-level controller comprises an oscillatory behavior characteristic of the instability when the number of times the amplified magnitude crosses zero within the certain time period exceeds the stability threshold; and
in response to determining that the reactive power command signal comprises oscillatory behavior characteristic of the instability, reducing one or more gains of a volt-var regulator of the farm-level controller to reduce the instability.

14. The system of claim 13, wherein the plurality of operations further comprise at least one of filtering or analyzing the reactive power command signal issued by the farm-level controller.

15. The system of claim 14, further comprising filtering and analyzing the reactive power command signal issued by the farm-level controller, wherein filtering the reactive power command signal issued by the farm-level controller further comprises filtering the reactive power command signal issued by the farm-level controller via a plurality of wash-out filters and a lag filter, and wherein analyzing the reactive power command signal issued by the farm-level controller further comprises:
determining a magnitude of the filtered reactive power command signal;
amplifying the magnitude of the filtered reactive power command signal; and
comparing the amplified magnitude of the reactive power command signal to a magnitude threshold,
wherein, when the amplified magnitude of the filtered reactive power command signal exceeds the magnitude threshold, starting a counter for counting a number of times the amplified magnitude crosses zero within a certain time period.

16. The system of claim 13, wherein reducing the one or more gains of the volt-var regulator of the farm-level controller to reduce the instability further comprises:
incrementally implementing a gain reduction counter for determining how much to reduce the one or more gains of the volt-var regulator of the farm-level controller to reduce the instability.

17. The system of claim 13, further comprising, in response to determining that the reactive power command signal comprises the oscillatory behavior characteristic of the instability, also maintaining a power output of the wind farm transmitted to the electrical grid.

* * * * *